US009767802B2

(12) United States Patent
Bianco

(10) Patent No.: US 9,767,802 B2
(45) Date of Patent: Sep. 19, 2017

(54) METHODS AND APPARATUS FOR CONDUCTING INTERNET PROTOCOL TELEPHONY COMMUNICATIONS

(71) Applicant: VONAGE BUSINESS INC., Atlanta, GA (US)

(72) Inventor: Itay Bianco, Tel Aviv (IL)

(73) Assignee: VONAGE BUSINESS INC., Atlanta, GA (US)

( * ) Notice: Subject to any disclaimer, the term of this patent is extended or adjusted under 35 U.S.C. 154(b) by 0 days.

(21) Appl. No.: 14/570,599

(22) Filed: Dec. 15, 2014

(65) Prior Publication Data

US 2015/0100315 A1 Apr. 9, 2015

Related U.S. Application Data

(63) Continuation-in-part of application No. 14/013,278, filed on Aug. 29, 2013, now Pat. No. 8,914,284.

(51) Int. Cl.

| | | |
|---|---|---|
| G10L 15/00 | (2013.01) | |
| G10L 15/26 | (2006.01) | |
| H04M 7/00 | (2006.01) | |
| H04M 3/42 | (2006.01) | |
| H04L 29/06 | (2006.01) | |

(52) U.S. Cl.
CPC .......... *G10L 15/26* (2013.01); *H04L 65/4015* (2013.01); *H04L 65/605* (2013.01); *H04M 3/42391* (2013.01); *H04M 7/006* (2013.01); *H04M 2201/40* (2013.01); *H04M 2203/352* (2013.01); *H04M 2203/654* (2013.01)

(58) Field of Classification Search
CPC ........ G10L 15/26; G10L 19/00; G10L 19/167

USPC ........................................................ 704/260
See application file for complete search history.

(56) References Cited

U.S. PATENT DOCUMENTS

| | | | |
|---|---|---|---|
| 6,075,842 A | 6/2000 | Engelke et al. | |
| 8,244,540 B2* | 8/2012 | Proux ............... | H04M 1/72552 379/88.01 |
| 2001/0005411 A1 | 6/2001 | Engelke et al. | |
| 2002/0161579 A1 | 10/2002 | Saindon et al. | |
| 2003/0125952 A1* | 7/2003 | Engelke .................. | H04L 12/66 704/260 |
| 2004/0267527 A1 | 12/2004 | Creamer et al. | |
| 2006/0190250 A1 | 8/2006 | Saindon et al. | |
| 2006/0293888 A1* | 12/2006 | Jindal ............... | H04M 3/42221 704/235 |
| 2007/0143103 A1 | 6/2007 | Asthana et al. | |

(Continued)

OTHER PUBLICATIONS

International Search Report Issued in PCT/US2014/053362 on Nov. 19, 2014.
Written Opinion Issued in PCT/US2014/053362 on Nov. 19, 2014.

*Primary Examiner* — Daniel Abebe
(74) *Attorney, Agent, or Firm* — Nixon & Vanderhye P.C.; Joseph Pagnotta

(57) ABSTRACT

IP telephony communications are conducted by sending both audio data produced by a CODEC that represents received spoken audio input, and a textual representation of the spoken audio input. A receiving device utilizes the textual representation of the spoken audio input to help recreate the spoken audio input when a portion of the CODEC data is missing. The textual representation can be generated by a speech-to-text function. Alternatively, the textual representation can be a notation of extracted phonemes.

17 Claims, 9 Drawing Sheets

(56) References Cited

U.S. PATENT DOCUMENTS

| | | | |
|---|---|---|---|
| 2008/0043990 A1 | 2/2008 | Vemuri et al. | |
| 2010/0030557 A1* | 2/2010 | Molloy | G10L 13/00 704/235 |
| 2011/0195739 A1* | 8/2011 | Deleus | H04W 4/00 455/518 |
| 2012/0148064 A1* | 6/2012 | Glaser | H04H 20/28 381/77 |
| 2012/0150538 A1* | 6/2012 | Proux | H04M 1/72552 704/235 |

* cited by examiner

METHODS AND APPARATUS FOR CONDUCTING INTERNET PROTOCOL TELEPHONY COMMUNICATIONS

This application is a continuation-in-part of U.S. application Ser. No. 14/013,278, which was filed Aug. 29, 2013, the contents of which is incorporated herein by reference.

BACKGROUND OF THE INVENTION

The invention is related to Internet Protocol (IP) telephony systems. More specifically, the invention is related to systems and methods for improving the perceived quality of IP telephony communications.

Existing IP telephony systems allow users to place and receive telephone calls or to send and/or receive other types of communications, such as text messages, SMS messages, MMS messages and the like. The communications are transmitted, at least in part, by data packets that traverse a private and/or public data network.

For example, a calling party can place a telephone call to a called party using an IP telephony device that is coupled to a private or public data network. When the user requests that the call be placed, an IP telephony system receives the request and assists in setting up the call between the calling party's telephony device and the called party's telephony device. The called party's telephony device can also be an IP telephony device that is coupled to a private or public data network. Alternatively, the called party's telephony device could be an analog telephone that is coupled to a publically switched telephony network (PSTN). In still other instances, the called party's telephony device could be a cellular telephone or a mobile computing device with cellular telephone capabilities that is coupled to a cellular telephony network.

Once the call begins, the calling party's telephony device takes spoken audio input provided by the user and converts the spoken audio input into a stream of data packets that are transmitted over a data network. If the call has been placed to another IP telephony device, those data packets may be delivered to the called IP telephony device, and the called IP telephony device then utilizes the data packets to recreate the spoken audio input. If the call has been placed to an analog telephone or a cellular telephone, then one or more elements of the IP telephony system may convert the data packets sent from the calling IP telephony device back into analog signals that are passed along to a PSTN or cellular telephony system that connects the call to the called party. In other instances, the data packets generated by the calling IP telephony device may be passed along to an element of the PSTN or cellular telephony system, which then converts the digital data into a form that can be used by the called telephony device.

The calling party's IP telephony device typically uses a computer algorithm or piece of software known as a CODEC to convert an analog signal representative of the calling party's spoken audio input into a stream of digital data packets that are transmitted over the data network. The data packets are then converted back into an analog signal that can be used to reproduce the spoken audio input using a similar CODEC that is employed by the called party's IP telephony device, or by an element of the IP telephony system, the PSTN or the cellular network. Different CODECs can employ differing levels of compression, and therefore tend to offer varying levels of fidelity or sound quality. Generally, the greater the degree of compression, the lower the resulting sound quality.

When the digital data packets traverse the data network, some data packets may be lost between the calling party's IP telephony device, and the element responsible for converting the digital data packets back into an analog audio signal. Also, each individual data packet may traverse a very different path through the data network, particularly where the data network is the public Internet. As a result, the data packets often arrive at the receiving device out of order. The receiving device usually employs a data buffer to help re-assemble the stream of data packets back into the proper order before they are used by the CODEC to generate an analog audio signal that reproduces the spoken audio input. However, if a data packet is delayed too long, it will arrive too late to be re-inserted into its proper place in the stream, and it is therefore discarded.

The loss of data packets during transmission between two devices can have a significant impact on the sound quality or fidelity of the reproduced spoken audio input. The problem is magnified when a high degree of compression is employed by the CODECs, because each lost data packet represents a greater overall portion of the audio. It would be desirable to find a method of increasing the audio quality of the reproduced sound in those instances where lost data packets are having a noticeable impact on the sound quality of the reproduced audio.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
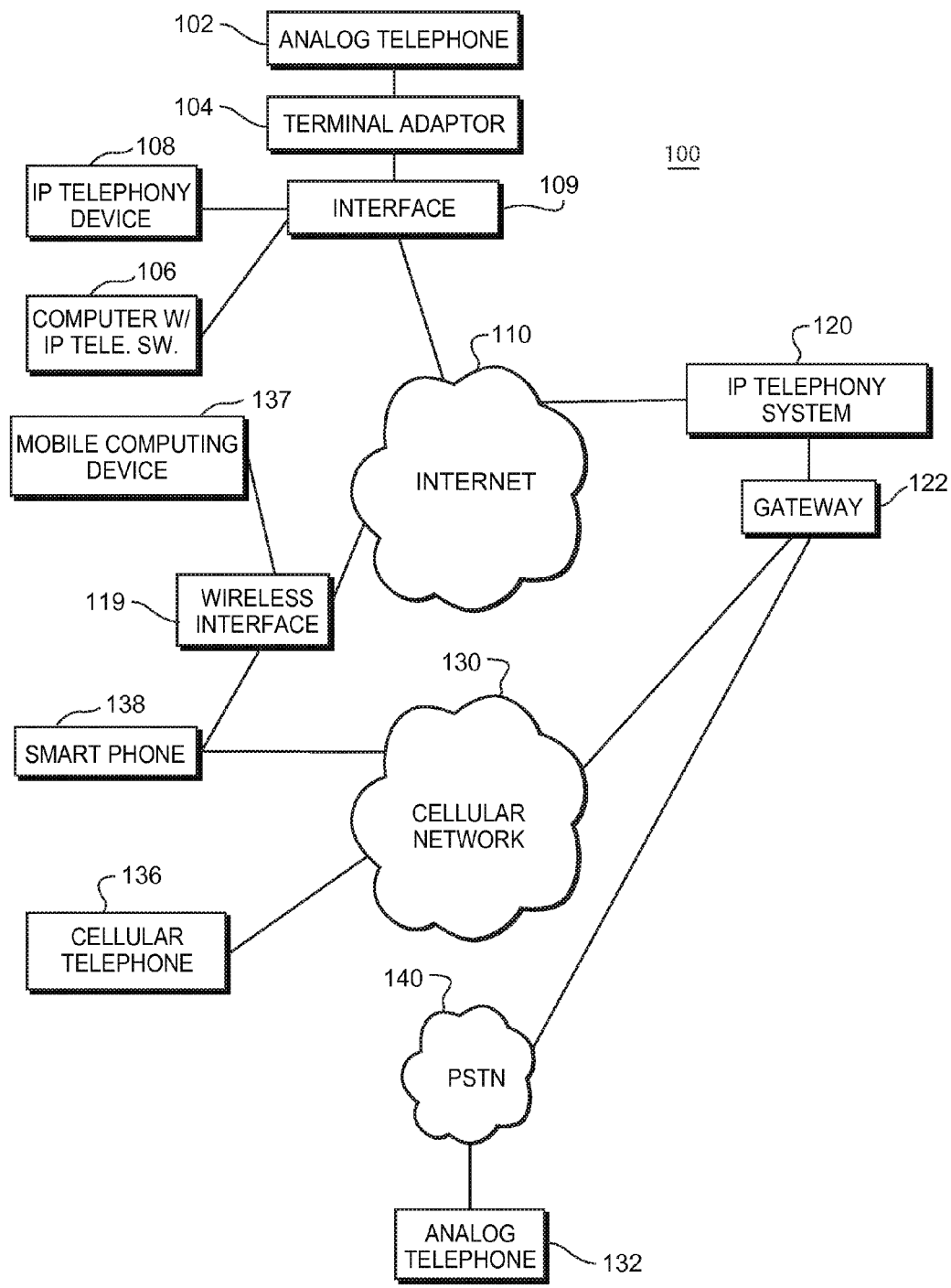
FIG. 1 is a diagram of a communications environment including various elements which are associated with an Internet protocol (IP) telephony system operating in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 140 and a cellular telephony network 130 via one or more gateways 122.

The gateway 122 allows users and devices that are connected to the PSTN 140 and cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephony device 108 that is connected to the Internet 110 via an interface 109. Such an IP telephony device 108 could be connected to an Internet service provider via a wired connection or via a wireless router.

Alternatively, a customer could utilize a normal analog telephone 102 which is connected to the Internet 110 via a terminal adapter 104 and the interface 109. The terminal adapter 104 converts analog signals from the telephone 102 into data signals that pass over the Internet 110, and vice versa. Analog telephony devices include, but are not limited to, standard telephones and document imaging devices such as facsimile machines.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a terminal adaptor 104 that is connected to one or more analog telephones 102.

Likewise, a mobile computing device 137 may be used to send and receive telephony communications via the IP telephony system 120. The mobile computing device 137 could establish a data connection to the Internet 110 via a wireless interface 119, such as a WiFi router. IP telephony software on the mobile computing device 137 could then be used to conduct telephony communications through the IP telephony system 120.

A third party using an analog telephone 132 which is connected to the PSTN 140 may call a customer of the IP telephony system 120. In this instance, the call is initially connected from the analog telephone 132 to the PSTN 140, and then from the PSTN 140, through the gateway 122 to the IP telephony system 120. The IP telephony system 120 then routes the call to the customer's IP telephony device. Likewise, a third party using a cellular telephone 136 could also place a call to an IP telephony system customer, and the connection would be established in a similar manner, although the first link would involve communications between the cellular telephone 136 and a cellular telephony network 130.

In addition, a smart phone 138 that includes both mobile computing capabilities and cellular telephony capabilities can connect to the cellular network 130 using its cellular telephone capabilities. However, the smart phone 138 also may establish a data connection to the IP telephony system 120 via a wireless interface 119 and the Internet 110. In this instance, communications between the smart phone 138 and other parties could be entirely carried by data communications. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephony device 108 located in a country outside the U.S. to access the services. Likewise, the customer could also utilize a computer with IP telephony software 106 or a mobile computing device with IP telephony software 137 outside the U.S. to access the IP telephony system 120. Further, in some instances a user could place a telephone call with the analog telephone 132 or the cellular telephone 136 that is routed through the PSTN 140 or cellular network 130, respectively, to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 140 or cellular network 130.

Figure 2:
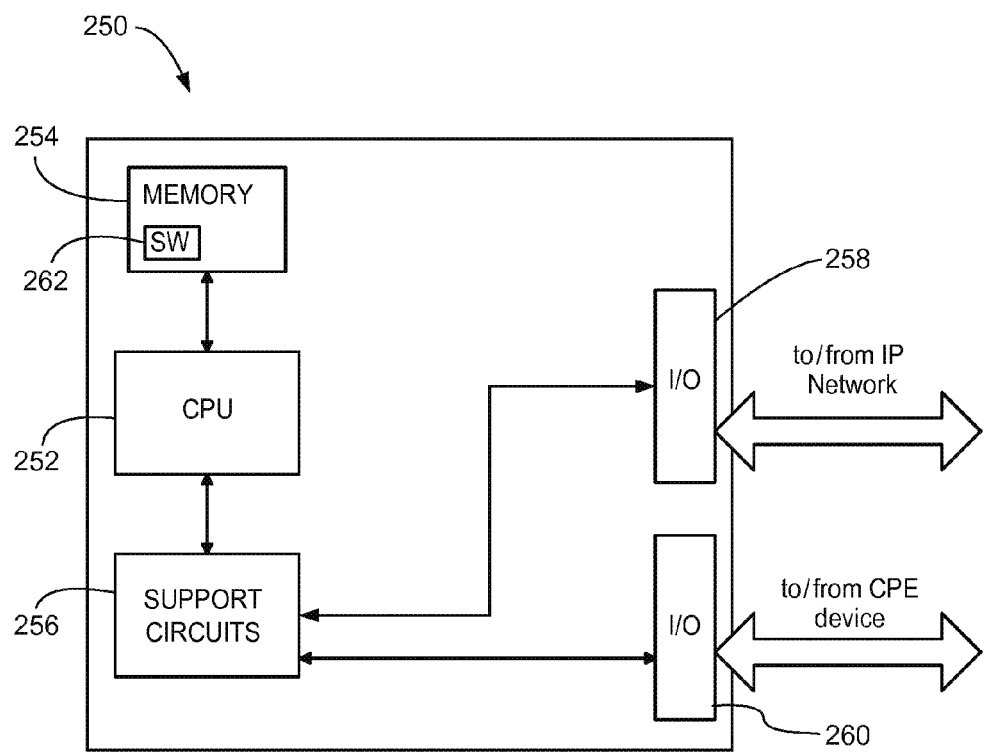
FIG. 2 is a diagram of various elements of a processor that forms part of an IP telephony system.

FIG. 2 illustrates elements of a computer processor 250 that can be used as part of the IP telephony system 120 to accomplish various functions. The IP telephony system 120 could include multiple processors 250 located at various locations in the system, along with their operating components and programming, each carrying out a specific or dedicated portion of the functions performed by the IP telephony system 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to conduct or participate in an IP telephony communication. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod touch can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

As mentioned above in the Background section, an IP telephony device utilizes IP telephony software to conduct a telephone call. The user's spoken audio input is captured by a microphone that typically generates an analog signal. A CODEC is used to convert that analog signal into a stream of digital data packets that are transmitted to a destination device via a data network. Likewise the IP telephony software receives a stream of digital data packets, and a CODEC is used to convert that digital data into an analog signal that can be applied to a speaker to recreate the spoken audio input of the other party to the telephone call.

Provided the data connection is good, and nearly all of the data packets being sent by the user's IP telephony device are timely received at the destination device, and assuming that nearly all of the data packets sent by the destination device are timely received by the user's IP telephony device, the audio quality of the telephone call will remain good. However, if any significant portion of the data packets is being lost, or if the data packets are experiencing significant amounts of jitter, the audio quality can become poor.

In part, the sensitivity of the audio quality to lost data packets is a function of the amount of data being conveyed between the two devices. Another factor is the time sensitive nature of the communications. Any significant delay in the delivery of the data packets can lead to unacceptable delays in the delivery and playback of a party's spoken audio input. For this reason, any significantly delayed data packets are often simply discarded, leading to greater data loss.

If smaller amounts of data were being conveyed between the two devices, it might be possible to send redundant data packets. It also may be possible to perform error correction techniques to ensure that all of the data sent from one of the devices is received by the other device.

A textual transcription or representation of spoken audio input can be transmitted with far fewer data packets than the digital data created by a CODEC from the spoken audio input. This difference between the relative amounts of data can be exploited to improve the perceived sound quality of an IP telephony communication.

The inventors propose a new way of conducting an IP telephony communication in which a textual representation of spoken audio input is transmitted along with the data created by a CODEC from the spoken audio input. The amount of additional data required to send the textual representation is quite small compared to the amount of data created by a CODEC from the spoken audio input. The textual representation is used by the receiving device, along with the digital data created by the CODEC, to generate an analog signal that can be used to reproduce the user's original spoken audio input. If a portion of the digital data created by the CODEC is missing or corrupted, the corresponding portion of the transcription is used to fill in the missing portion using a text-to-speech capability.

In some embodiments, the textual representation data simply acts as a backup to the data created by the CODEC. If small portions of the data created by the CODEC are missing at the destination device, it is unlikely that exactly the same portions of the textual representation data also will be missing. Thus, in most cases, the textual representation data can be used to replace missing CODEC data.

Also, because the textual representation of a user's spoken audio input can be encapsulated in far fewer digital data packets than the data created by a CODEC, it is possible to redundantly send multiple copies of the textual representation data, or perform error correction techniques, to ensure that a substantially complete copy of the textual representation data arrives at the destination device.

Figure 3:
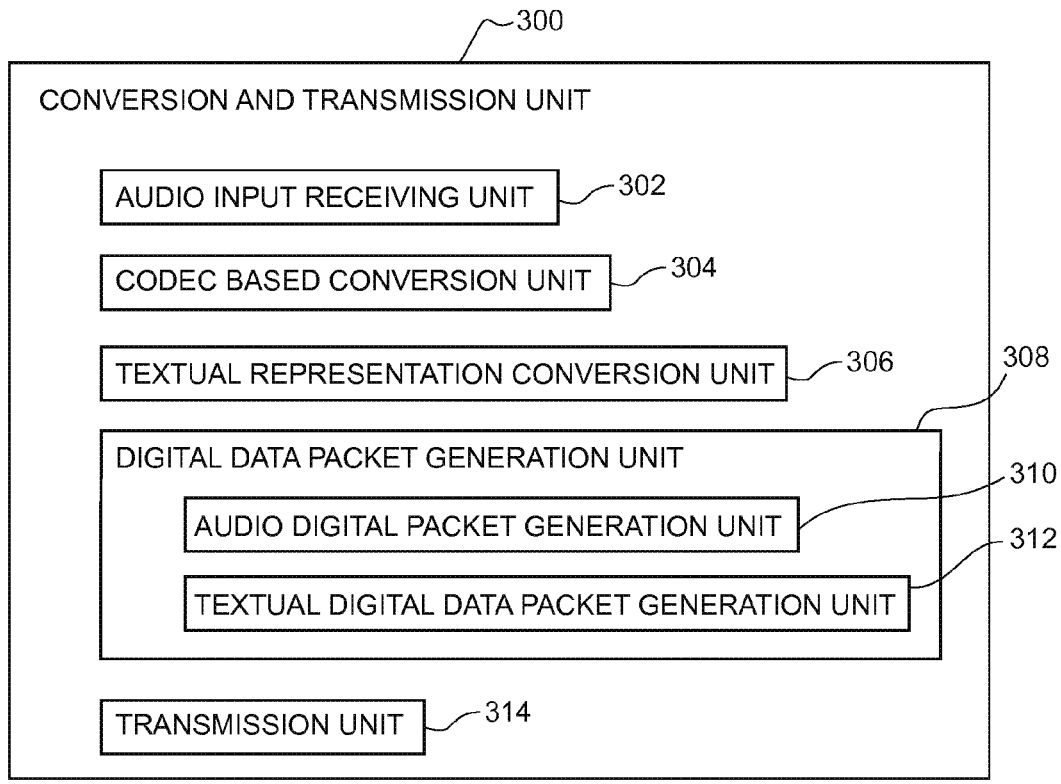
FIG. 3 is a block diagram illustrating elements of a conversion and transmission unit that generates data from received spoken audio input, and that transmits the data to a destination device.

FIG. 3 illustrates elements of a conversion and transmission unit 300 that can be used to create the audio and textual digital data that is sent from an IP telephony device as part of performing an IP telephony communication. In many instances, the conversion and transmission unit 300 would be resident on the IP telephony device itself. The conversion and transmission unit may be implemented by IP telephony software resident on an IP telephony device. However, as will be described in more detail below, in some embodiments an element of the IP telephony system may perform some or all of the functions of the conversion and transmission unit 300.

The conversion and transmission unit includes an audio input receiving unit 302, which receives a user's spoken audio input. In fact, the audio input can include sounds other than simply spoken words. However, for purposes of the foregoing and following descriptions, the term "spoken audio input" will be used to refer to all the sounds captured by a microphone of an IP telephony device. The audio input receiving unit 302 typically receives this spoken audio input in the form of an analog signal generated by a microphone of the IP telephony device.

A CODEC based conversion unit 304 converts the received spoken audio input into a stream of audio digital data, as is well known to those skilled in the art. IP telephony software resident on an IP telephony device may be capable of using multiple different CODECs. Some CODECs which generate relatively large amounts of data and which provide good audio quality are used when there is sufficient bandwidth to transmit all the data. When available bandwidth is limited, the CODEC based conversion unit 304 may switch to a different CODEC that produces less audio digital data from the same spoken audio input, and which typically provides lower audio quality. Further, the CODEC based conversion unit 304 may be capable of downloading and using new CODECs as they become available.

A textual representation conversion unit 306 converts the same spoken audio input into a textual representation of the spoken audio input. In some embodiments, the textual representation conversion unit performs a speech-to-text conversion that results in a simple text version of the spoken audio input that could be read by a human. This will require that the textual representation conversion unit have or have access to speech recognition assets. Those speech recognition asserts could be wholly resident on the IP telephony device. In alternate embodiments, all or a portion of the speech recognition assets could be resident on another computing device which is accessible via a data network connection.

In other embodiments, the textual representation conversion unit 306 could extract phonemes from the spoken audio input, and then generate a textual representation of the extracted phonemes. A phoneme is a basic unit of a particular language's phonology. In other words, a set of phonemes corresponds to a set of speech sounds which appear in a spoken language. Phonemes are combined to create words in a language. Different languages have different phonemes, although certain phonemes appear in many different languages.

The phonemes which are used in a particular language can be recorded as symbols, such as letters or characters. Thus, one can record a set of phoneme symbols to represent a set of sounds which occur in a spoken phrase or sentence. In some embodiments, the textual representation conversion unit 306 generates a phoneme transcription of the spoken audio input, instead of a text based transcription that is readily readable by a human.

The use of phonemes for the transcription of spoken audio input may be advantageous, as compared to a speech-to-text transcription. Most speech-to-text transcription techniques rely upon context to determine the individual words spoken by a user. This can require the recognition of at least a second spoken word to determine the correct transcription of a first spoken word. In the context of an IP telephony communication, this would mean that it is sometimes impossible to determine the correct speech-to-text transcription of a first word until the user has spoken at least a second word. And the transcription delay may mean that the textual transcription cannot be sent to the destination device quickly enough to be useful in helping to create an acceptably real-time audio reproduction of the user's spoken audio input on the destination telephony device.

In contrast, if individually identifiable sounds are being transcribed into phoneme notations, the phoneme notations can be transmitted to the destination device substantially immediately. Also, if the destination device needs to use the phoneme notations to help recreate a portion of the user's spoken audio input for which the CODEC data is missing, it may be easier to generate a particular phoneme sound than to reproduce only a portion of a missing word from a regular textual transcription.

If the textual representation conversion unit 306 is creating a phoneme notation transcription, it may be helpful to know the language being spoken by the user in order to better or more rapidly create a phoneme notation version of the spoken audio input. For this reason, the textual representation conversion unit 306 may analyze the initial portions of a user's spoken audio input to determine the language being spoken. Thereafter, the textual representation conversion unit 306 may utilize only the subset of all possible phonemes which appear in the identified language for purposes of creating the phoneme transcription of the spoken audio input. Utilizing the subset of phonemes for the identified language may also make it possible to more quickly create and transmit the phoneme transcription.

Once a textual representation of the spoken audio input is generated, the textual representation is converted into textual digital data by the textual representation conversion unit 306. As noted above, the size of the textual digital data that is generated for a particular portion of spoken audio input could be considerably smaller than the size of the audio digital data that is generated for the same portion of spoken audio input.

A digital data packet generation unit 308 then loads the audio digital data and the textual digital data into one or more streams of digital data packets. In some embodiments, the audio digital data and the textual digital data are loaded into a single stream of data packets, with the audio digital data taking up a first portion of each digital data packet and the textual digital data taking up a second portion of each data packet.

In other embodiments, the digital data packet generation unit 308 could include an audio digital data packet generation unit 310 and a separate textual digital data packet generation unit 312. In such embodiments, two streams of digital data packets are generated, one for the audio digital data and one for the textual digital data. The audio and digital data packets could have the same format, or different formats. Details about the various ways in which the audio digital data and the textual digital data is loaded into data packets is discussed in detail below.

A transmission unit 314 sends the digital data packets generated by the digital data packet generation unit 308 to a destination device. The data could be sent in multiple different ways. In some embodiments, a single stream of data packet that include both audio digital data and textual digital data is sent to the destination device. In other embodiments, a first stream of audio digital data packets and a second stream of textual digital data packets are sent to the destination device Because the amount of textual digital data generated by the textual representation conversion unit 306 is considerably smaller than the amount of audio digital data being generated by the CODEC based conversion unit 304, it may be possible to load the textual digital data generated by the textual representation conversion unit 306 into one or more unused headers of the same data packets that have payloads full of audio digital data generated by the CODEC based conversion unit 304.

In alternate embodiments, the audio digital data could be loaded into a first portion of the payload of each digital packet and the textual digital data packet could be loaded into a second portion of the payload of each digital data packet. Where audio digital data and the textual digital data is loaded into first and second portions of the payload of a data packet, the amount of textual digital data that is generated may be somewhat variable. For this reason, information about the number of bytes of textual digital data that has been loaded into a data packet could be encoded into the data packet, either in a header, or in a dedicated portion of the payload. Also, the textual digital data could always be the first bytes in the payload, or always be the last bytes in the payload. Once the variable amount of textual digital data is loaded into the proper position, audio digital data could be loaded into the remaining space in the payload. When the audio and digital data is loaded in this fashion, the receiving device could first read the information about the size of the textual data in the payload, and then strip that amount of data out of either the front or end of the payload. This, of course, would be the textual digital data. Any remaining data in the payload will be assumed to be audio digital data.

When both audio digital data and textual digital data is loaded into each data packet, each data packet should preferably include audio digital data corresponding to a first portion of the spoken audio input, and textual digital data generated corresponding to a second, different portion of the spoken audio input. Because the textual digital data is intended to provide a backup to the audio digital data, it may be less-than-ideal to load the audio digital data and the textual digital data for the same portion of the spoken audio input into the same data packet, since loss of that data packet would mean both the audio digital data and the backup textual digital data would be lost. Further, because the amount of data required to transmit a textual representation is much less than that needed to transmit CODEC audio data, the textual representation in a given packet may correlate to a substantially greater length of speech than the audio data; this also promotes redundancy in transmitting the text data.

Regardless of how the data is transmitted to the destination device, it is necessary to utilize some method to identify portions of the audio digital data and portions of the textual digital data that relate to the same portion of the spoken audio input. If audio digital data is lost during transmission, and the textual digital data is to be used to re-create the portion of the spoken audio input which is missing in the audio digital data, one must be able to locate the corresponding portion of the textual digital data. In some embodiments, this could be achieved by including timestamp information in both the audio digital data and the textual digital data. The timestamp information would correspond to a time within the spoken audio input. If this approach is taken, and a portion of the audio digital data is lost, one could easily identify the portion of the textual digital data for the missing time period.

Another option is to include sequence numbers in the stream of data packets containing the audio digital data and the textual digital data. In many cases, each data packet of audio digital data covers a set duration of time in the spoken audio input. If sequence numbers are included in the data packets bearing audio digital data, it is possible to calculate what portion of time in the spoken audio input the data packet covers.

Where separate streams of audio digital data packets and textual digital data packets are generated, the sequence numbers for a set of audio digital data packets that correspond to a portion of the spoken audio input could be encoded into each textual digital data packet that corresponds to the same portion of the spoken audio input. The assumption here is that it will take multiple audio digital data packets to encode a portion of the spoken audio input that is encoded in a single textual digital data packet. However, if the number of textual digital data packets being generated per unit of time of the spoken audio input is larger than the number of audio digital data packets that are generated for the same unit of time, then the reverse could occur. In other words, the sequence numbers of multiple textual digital data packets corresponding to a portion of the spoken audio input could be encoded into a audio digital data packet that corresponds to the same portion of the spoken audio input.

When sequence numbers are used, if some of the audio digital data is missing, it would be possible to calculate what portion of the spoken audio input the missing audio digital data represents based on the sequence numbers that are missing in the audio digital data packets. One could then determine the identity of the textual digital data packets that bear the same portion of the spoken audio input. One could then access the textual digital data and use it to replace the missing spoken audio input from the missing audio digital data.

Figure 4:
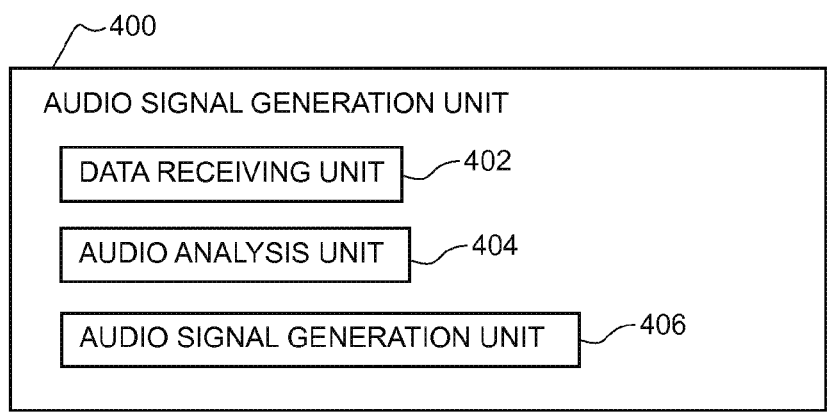
FIG. 4 is a block diagram of an audio signal generation unit that receives digital data and which employs the received data to generate a signal that can be used to reproduce spoken audio input.

FIG. 4 illustrates elements of an audio signal generation unit 400 which utilizes the data sent from a transmission unit 314 of a conversion and transmission unit 300 to generate a signal which can be used to reproduce spoken audio input. A data receiving unit 402 receives the data sent from a transmission unit 314. If the received data is encapsulated into a single stream of data packets, with audio digital data in one portion of each data packet and textual digital data in a second portion of each data packet, the data receiving unit 402 may separate the data into separate local streams.

An audio analysis unit 404 reviews the received audio digital data to determine if any portion of the audio digital data is missing. If only a very small portion of the audio digital data is missing, the audio digital data alone may be used to recreate the spoken audio input. However, if a significant portion of the audio digital data is missing, the textual digital data is used to help recreate the portion of the spoken audio input corresponding to the missing audio digital data.

An audio signal generation unit 406 uses the received data to create a signal which is used to generate sounds that recreate the spoken audio input. In some embodiments, the signal is an analog signal that is applied to a speaker to cause the speaker to generate sounds that recreate the spoken audio input. The audio signal generation unit 406 uses a CODEC and the audio digital data generated by the CODEC based conversion unit 304 of a sending device to generate the analog signal. In many embodiments, the CODEC that is used is identical to or compatible with the CODEC used by the CODEC based conversion unit 304 of the sending device. In some instances, however, the audio digital data generated by the CODEC based conversion unit 304 of the sending device may be converted during transmission to a new format. In this instance, the CODEC used by the audio signal generation unit 406 may be different from the CODEC used by the CODEC based conversion unit 304 of the sending device.

If the audio analysis unit 404 determines that a portion of the received audio digital data is missing, the audio signal generation unit 406 uses the corresponding portion of the textual digital data generated by the textual representation conversion unit 306 of the sending device to help generate the analog signal that is to be used to recreate the spoken audio input. Either the audio analysis unit 404 or the audio signal generation unit 406 identifies the appropriate portion of the textual digital data.

If the textual digital data is a regular text transcription of the spoken audio input, the audio signal generation unit 406 performs a text-to-speech conversion of the selected portion of the textual digital data, and supplies the proper sounds for the missing portion of the CODEC data. The audio signal generation unit 406 may use text-to-speech conversion resources that are present on the same device as the audio signal generation unit 400, or the audio signal generation unit 406 may make use of some text-to-speech conversion resources that are loaded on a different device, but available over a data network.

If the textual digital data is a transcription of phonemes, a different sort of sound generation algorithm that is sound-based is used to generate the missing sounds, which are then inserted into the signal being generated by the audio signal generation unit 406. Here again, the resources being used to convert a transcription of phonemes into sounds may be present on the same device as the audio signal generation unit 406, or some or all of those resources may be present on a different device, but available via a data network connection.

The elements of the audio signal generation unit 400 may be part of IP telephony software loaded on a user's IP telephony device. Alternatively, the elements of the audio signal generation unit 400 may be present on a different element which is part of an IP telephony system, a PSTN or a cellular network.

As mentioned above, a conversion and transmission unit 300 and an audio signal generation unit 400 may both be part of IP telephony software loaded onto an IP telephony device. However, either or both of these units may be present on other elements in the transmission path between two telephony devices that are conducting a telephony communication, as is explained below.

Figure 5:
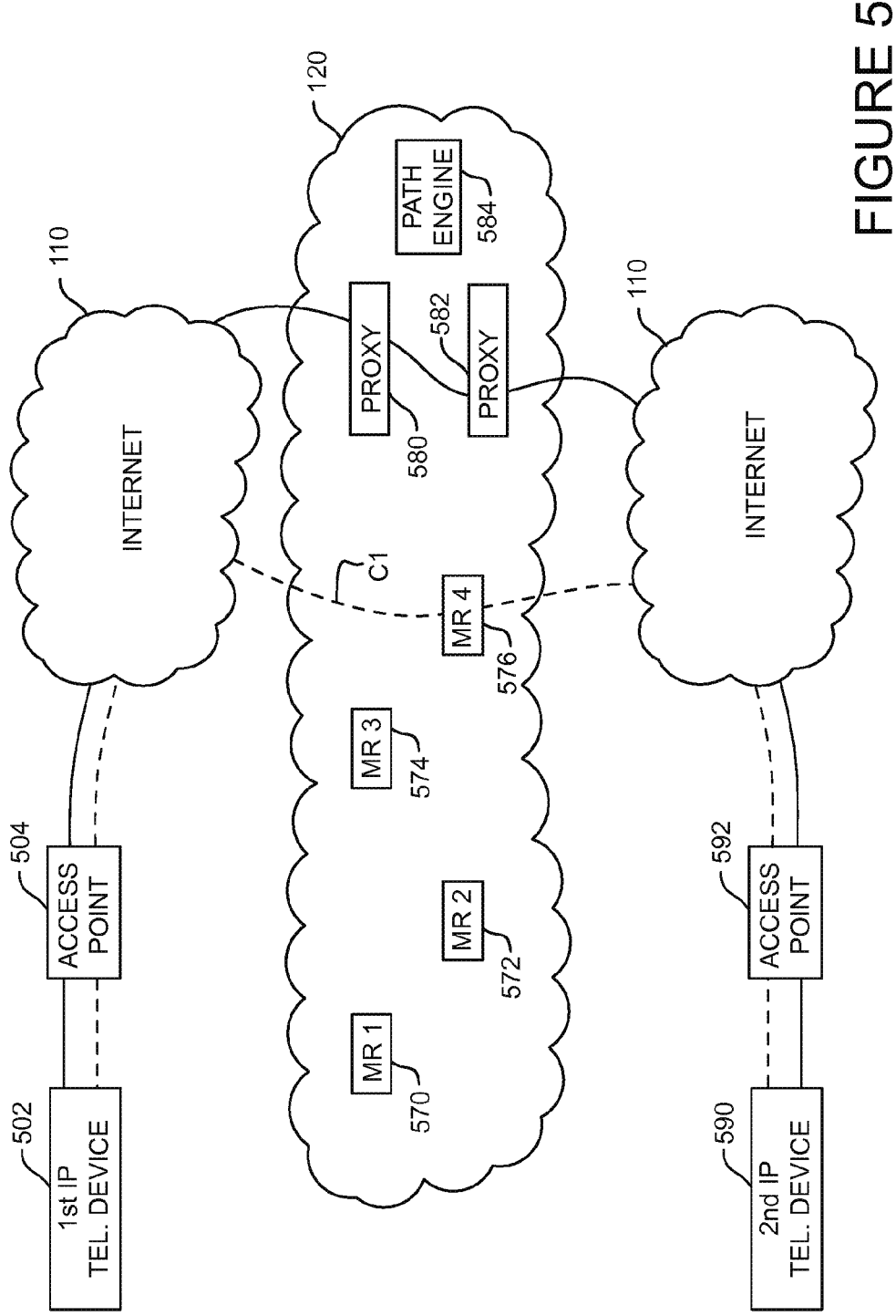
FIG. 5 is a diagram illustrating the paths which are used to carry data packets bearing the setup signaling and the media of a telephony communication between two IP telephony devices.

FIG. 5 provides a depiction of how a first IP telephony device 502 is connected to a second IP telephony device 590 for purposes of conducting a telephony communication. In FIG. 5, the solid lines represent the path traversed by call setup and control signaling. The dashed lines represent the path traversed by data packets bearing the media of the telephony communication. During call setup procedures, the IP telephony system can inform the calling telephony device and the called telephony device of a communication channel which can be used to transmit and receive data packets containing the media of the telephony communication. The called telephony device and the calling telephony device then route data packets bearing the media of the telephony communication through the identified communication channel.

As illustrated in FIG. 5, a communication channel can include one or more media relays. The IP telephony system may select a particular media relay to be used as part of a communication channel based on the proximity of the media relay to the called and/or calling telephony devices, based on historical data about the quality that the media relay typically offers, based on the cost of using the media relay, and based on a variety of other considerations. Although FIG. 5 illustrates the media relays which form part of a communication channel between two telephony devices as being a part of an IP telephony system 120, in alternate embodiments, the media relays which form all or part of a communication channel can be owned and/or controlled by third parties. Also, some communication channels could include one or more media relays which are part of an IP telephony system 120, as well as one or more media relays which are owned and/or controlled by a third party. Thus, the illustration of the media relays as being part of the IP telephony system 120 should in no way be considered limiting.

As shown in FIG. 5, a first IP telephony device 502 attempts to set up and conduct a telephony communication with a second IP telephony device 590. The first IP telephony device 502 sends a telephony communication setup request to a first proxy server 580 of an IP telephony system 120 via an access point 504 and the Internet 110. When the first proxy server 580 receives the setup request from the first IP telephony device 502, it consults a path engine 584 to identify a second proxy server 582 which is capable of communicating with the second IP telephony device 590. The first proxy server 580 then forwards the setup request to the second proxy server 582. The second proxy server 582 sends the setup request through the Internet 110 and a second access point 592 to the second IP telephony device 590.

Assuming the user of the second IP telephony device 590 wishes to engage in the communication, the first IP telephony device 502 and the second IP telephony device are then informed of, or themselves negotiate, a communications channel for data packets bearing the media of the telephony communication. In some instances, the setup signaling that the second IP telephony device 590 receives from the second proxy server 582 could include information identifying a communications channel. Similar setup signaling sent to the first IP telephony device 502 could inform the first IP telephony device 502 of the same communications channel. In alternate embodiments, the two IP telephony devices 502, 590 may negotiate a communications channel.

FIG. 5 illustrates that communications channel C1, which utilizes a fourth media relay 576, is to be used. In other instances, a first media relay 570, a second media relay 572 or a third media relay 574, or combinations of the first to fourth media relays, could be used to form the communication channel for the data packets bearing the media of the telephony communication. In still other instances, the first IP telephony device 502 and the second IP telephony device 590 may communicate directly with one another, via the first access point 504, the Internet 110 and the second access point 592, with no media relays involved.

In some situations, both the first IP telephony device 502 and the second IP telephony device 590 include a conversion and transmission unit 300 as illustrated in FIG. 3, and an audio signal generation unit 400 as illustrated in FIG. 4. In this situation, the conversion and transmission unit 300 on the first IP telephony device 502 creates audio digital data and textual digital data from the spoken audio input provided by the user of the first IP telephony device 502, and sends this data to the audio signal generation unit 400 on the second IP telephony device 590. Likewise, the conversion and transmission unit 300 on the second IP telephony device 590 creates audio digital data and textual digital data from the spoken audio input provided by the user of the second IP telephony device 590, and sends this data to the audio signal generation unit 400 on the first IP telephony device 502.

The audio signal generation unit 400 on the first IP telephony device 502 utilizes the audio digital data and the textual digital data sent from the conversion and transmission unit 300 on the second IP telephony device 590 to generate an analog signal that is applied to a speaker of the first IP telephony device 502 to recreate the spoken audio input provided by the user of the second IP telephony device 590. Likewise, the audio signal generation unit 400 on the second IP telephony device 590 utilizes the audio digital data and the textual digital data sent from the conversion and transmission unit 300 on the first IP telephony device 590 to generate an analog signal that is applied to a speaker of the second IP telephony device 590 to recreate the spoken audio input provided by the user of the first IP telephony device 502.

In another situation, the first IP telephony device 502 may include a conversion and transmission unit 300 as illustrated in FIG. 3 and an audio signal generation unit 400 as illustrated in FIG. 4, but the second IP telephony device 590 may not include these features. Instead, the second IP telephony device 590 may only be capable of generating audio digital data, and it may only be capable of using audio digital data to create an analog signal that is used to recreate the spoken audio input provided by the user of the first IP telephony device 502. Under these circumstances, a conversion and transmission unit 300 on the first IP telephony device 502 may still create and transmit audio digital data and textual digital data, and this data is sent to the fourth media relay 576. An audio signal generation unit 400 on the fourth media relay 576 uses both the audio digital data and the textual digital data to create a new stream of audio digital data which is then sent to the second IP telephony device 590. In fact, the fourth media relay 576 may have been selected for use in the communications channel C1 because it is capable of offering this functionality. The end result is that the textual digital data sent from the first IP telephony device 502 to the fourth media relay 576 can be used to help correct for any audio digital data that is lost in transmission between the first IP telephony device 502 and the fourth media relay 576.

The audio digital data that is generated by the fourth media relay 576 and sent to the second IP telephony device 590 may be encoded using a completely different CODEC than the one used by the first IP telephony device 502 to create audio digital data sent to the fourth media relay 576. Likewise, when the fourth media relay 576 receives audio digital data from the second IP telephony device 590, the fourth media relay 576 may convert the audio digital data into a new CODEC format which is then sent to the first IP telephony device.

The fourth media relay 576 may also include a conversion and transmission unit 300 as illustrated in FIG. 3. In this instance, when the fourth media relay 576 receives audio digital data from the second IP telephony device 590, it uses the audio digital data to generate a textual representation of the spoken audio input provided by the user of the second IP telephony device. The textual representation is then converted into textual digital data that is sent from the fourth media relay 576 to the first IP telephony device 502, along with audio digital data. The audio signal generation unit 400 on the first IP telephony device 502 then uses both the audio digital data and the textual digital data to generate an analog signal that is used to recreate the spoken audio input provided by the user of the second IP telephony device 590. This will help correct for any losses of data packets containing audio digital data which are sent from the fourth media relay 576 to the first IP telephony device.

The media relays which are selected for the communications path between the first IP telephony device 502 and the second IP telephony device 590 may be selected based on the capabilities they provide. For example, a communications channel that includes both the first media relay 570 and the second media relay 572 may be selected for the communications path. In that instance, the first media relay 570 may be capable of converting the audio digital data from a first CODEC format which is used by the first IP telephony device 502 to a second CODEC format which is used by the second IP telephony device 590. The second media relay 572 may include a conversion and transmission unit 300 and an audio signal generation unit 400 which can be used as described above.

Figure 6:
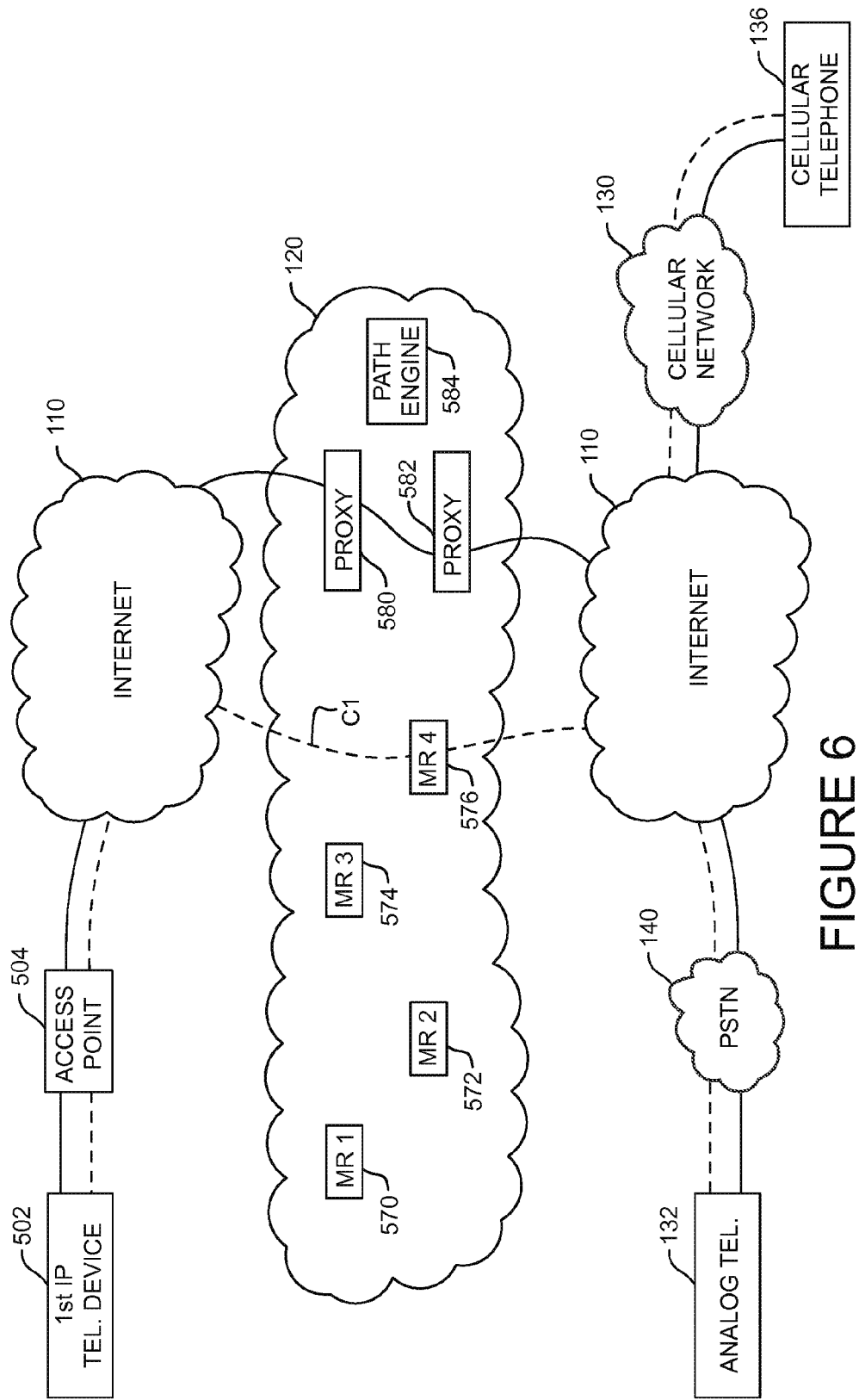
FIG. 6 is a diagram illustrating the paths which are used to carry data packets bearing the setup signaling and the media of a telephony communication between an IP telephony device and an analog telephone or a cellular telephone.

FIG. 6 illustrates alternate situations where a first IP telephony device 502 is capable of connecting to an analog telephone 132 via a PSTN 140, or a cellular telephone 136 via a cellular network 130. In this instance, the first IP telephony device 502 still includes a conversion and transmission unit 300 and an audio signal generation unit 400. However, the analog telephone 132 and the cellular telephone 136 lack these features.

When the first IP telephony device 502 sets up a telephony communication with the analog telephone 132 via the PSTN 140, the conversion and transmission unit 300 of the first IP telephone 502 generates both audio digital data and textual digital data, and this data is sent to the fourth media relay 576. The fourth media relay 576 converts this data into a stream of audio digital data, and sends the audio digital data to an element of the PSTN 140 capable of utilizing this data. The element of the PSTN converts the audio digital data to an analog signal that is sent to the analog telephone 132. Likewise, the element of the PSTN receives an analog signal from the analog telephone 132 and converts it to audio digital data which is then transmitted to the fourth media relay 576. As explained above, the fourth media relay 576 may simply pass the audio digital data to the first IP telephony device 502. Alternatively, the fourth media relay uses the audio digital data received from an element of the PSTN 140 to generate both audio digital data and textual digital data, and both types of data are communicated to the first IP telephony device 502.

In alternate embodiments, the fourth media relay 576 may send audio digital data to a gateway that is operated by the IP telephony system 120 or the PSTN 140, and the gateway may convert the audio digital data to an analog signal that is passed to the PSTN 140. The PSTN can then connect the analog signal to the analog telephone 132.

When a telephony communication is setup between the first IP telephony device 502 and the cellular telephone 136, things may occur in a manner similar to that described above for the analog telephone. An element of the cellular network 130 may receive audio digital data from the fourth media relay, and convert that data into a form that can be transmitted to the cellular telephone 136 over a cellular base station transceiver. Likewise, the cellular network may receive signals from the cellular telephone 136 that are representative of the spoken audio input provided by the user of the cellular telephone 136, and the element of the cellular network may convert those signals into audio digital data that is sent to the fourth media relay 576.

In still other situations, the fourth media relay 576 may send both audio digital data and textual digital data to an element of the PSTN 140 or an element of the cellular network 130, and those elements can use both forms of data to create signals that are coupled to the analog telephone 132 or cellular telephone 136. Operating in this fashion would help to correct for any data packets that are lost between the fourth media relay 576 and the elements of the PSTN 140 or cellular network 130.

Figure 7:
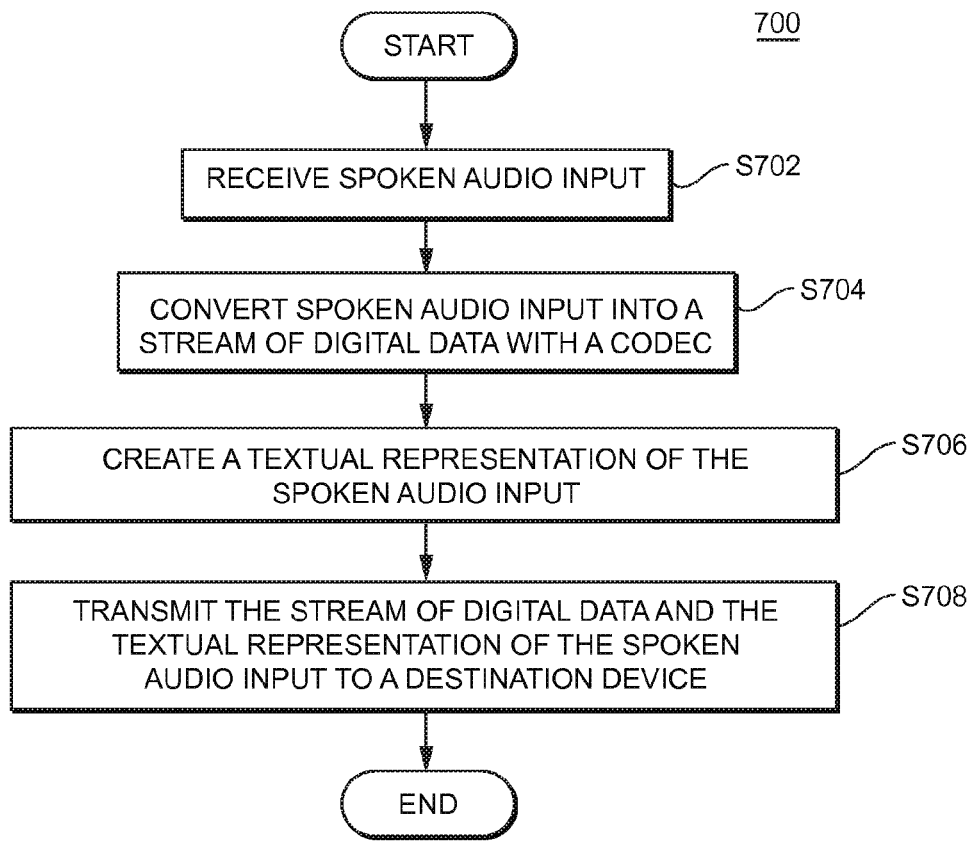
FIG. 7 is a flow diagram illustrating steps of a first method of receiving spoken audio input, converting the spoken audio input into digital data, and transmitting the digital data to a destination device.

FIG. 7 illustrates steps of a method that is performed by a conversion and transmission unit 300, as illustrated in FIG. 3. The method 700 begins and proceeds to step S702 where an audio input receiving unit 302 receives spoken audio input. The spoken audio input could be received in the form of an analog signal generated by a microphone of a telephony device. In step S704, the CODEC based conversion unit converts the spoken audio input into a stream of audio digital data using a CODEC. In step S706, the textual representation conversion unit 306 generates a textual representation of the received spoken audio input. This could include generating a normal text version of the spoken audio input using speech-to-text functionality, or generating a phoneme transcription of the spoken audio input. The textual representation is then used to generate a stream of textual digital data.

In step S708, the audio digital data and textual digital data is loaded into data packets by a digital data packet generation unit 308. Those digital data packets are then sent to a destination device by a transmission unit 314. Those of skill in the art will appreciate that all of these steps will be performed substantially simultaneously for different portions of the spoken audio input until the telephony communication is terminated.

Figure 8:
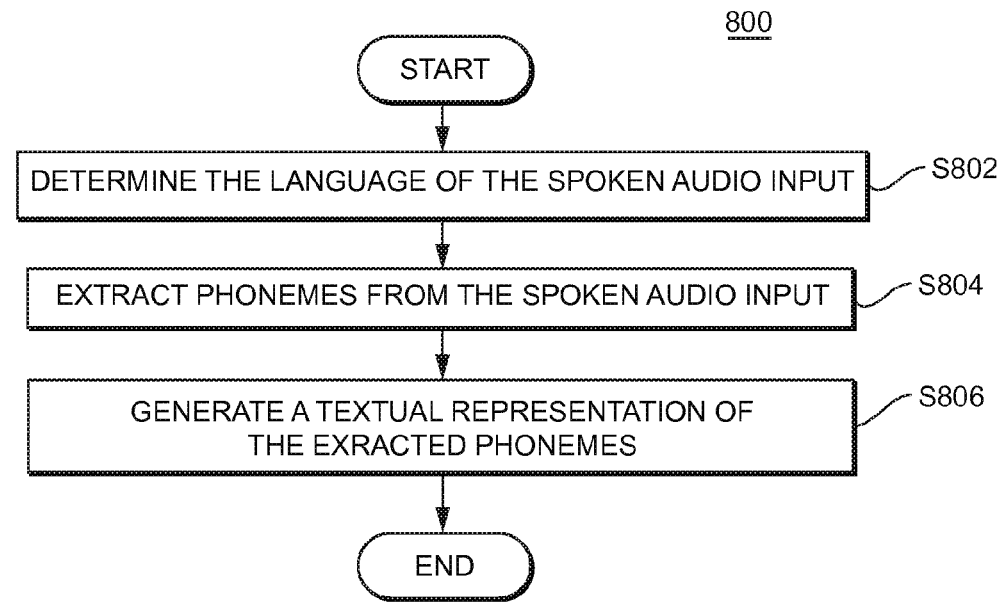
FIG. 8 is a flow diagram illustrating steps of a method of generating a textual representation of spoken audio input.

FIG. 8 illustrates additional details of step 706 of the method illustrated in FIG. 7. These steps are performed when the textual representation conversion unit 306 is converting spoken audio input into a phoneme transcription based on the language of the spoken audio input. The method 800 begins and proceeds to step 802 where initial portions of the spoken audio input are analyzed to determine the language being spoken, and perhaps also a dialect. In alternate embodiments, the language and/or dialect could be determined in other ways. In step S804, phonemes are extracted from the spoken audio input based on the determined language. As mentioned above, once the language is determined, portions of the spoken audio input can be compared to only those phonemes that are used in the determined language in order to extract the phonemes from the spoken audio input. Portions of the spoken audio input may also be compared to the phonemes that were previously identified during the communication to a high degree of certainty.

In step S806, a textual representation of the extracted phonemes is generated. This can be accomplished using a set of symbols or characters that correspond to the extracted phonemes. As will be appreciated by one skilled in the art, steps S804 and S806 would be performed simultaneously for different portions of the spoken audio input until the telephony communication is terminated.

Figure 9:
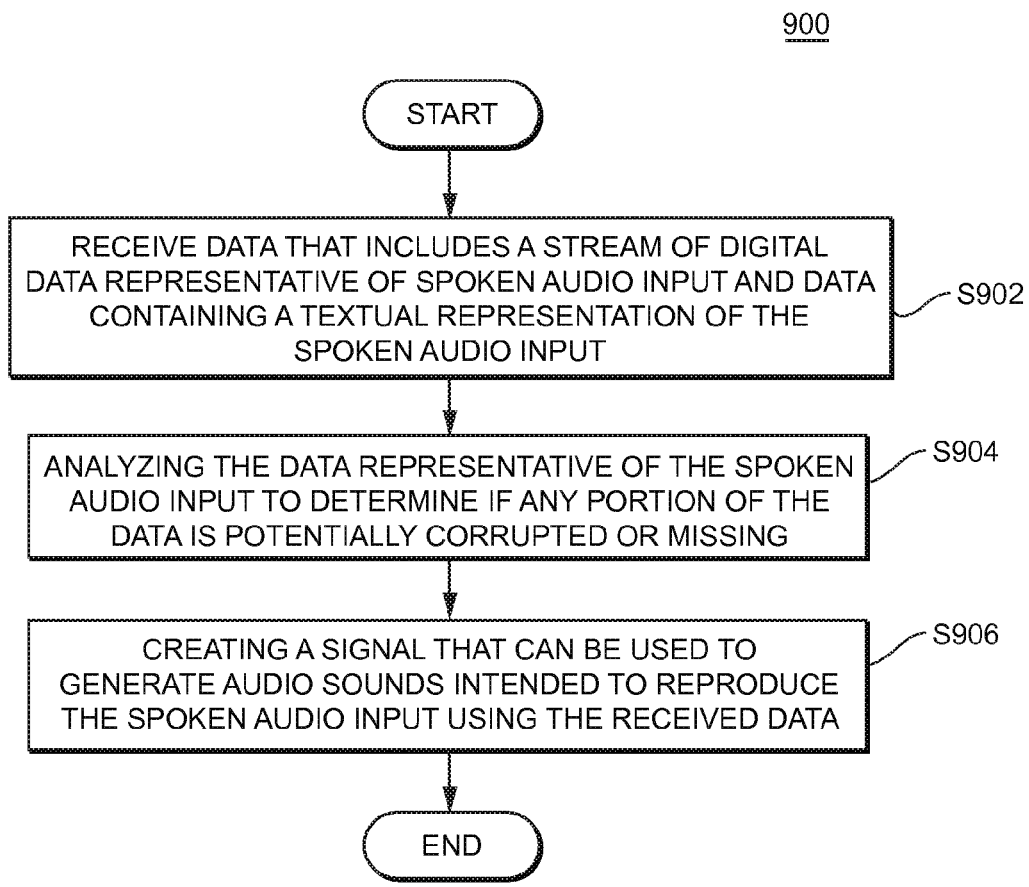
FIG. 9 is a flow diagram illustrating steps of a method of receiving digital data and of generating a signal that can be used to reproduce spoken audio input using the received data.

FIG. 9 illustrates steps of a method that is performed by an audio signal generation unit 400, like the one illustrated in FIG. 4. The method 900 begins and proceeds to step S902, where data is received by a data receiving unit. The received data includes audio digital data representative of spoken audio input, and textual digital data that is representative of a textual representation of the spoken audio input. The data can be encapsulated in a single stream of data packets, or in two separate streams of data packets. If the data is encapsulated into a single stream of data packets, the data receiving unit 402 may separate the audio digital data and the textual digital data into two separate streams, In step S904, the received audio digital data is analyzed by an audio analysis unit 404 to determine if any portion of the audio digital data is missing or corrupted. If a portion of the audio digital data is missing, the audio analysis unit 404 may identify a portion of the textual digital data that corresponds to the missing audio digital data. In step S906, a signal is created by an audio signal generation unit 406 using at least the audio digital data. If a portion of the audio digital data is missing, the corresponding portion of the textual digital data is used to help generate the audio signal. The audio signal may comprise an analog signal that is applied to a speaker to recreate the spoken audio input.

If a portion of the audio digital data is missing or corrupted, the audio signal generation unit 406 may take into account characteristics of the spoken audio input when determining how to generate sounds from the corresponding portion of the textual digital data. For example, if the individual that provided the spoken audio input is male, the audio signal generation unit 406 may generate portions of the audio signal from the textual digital data using a lower pitched tone than if the individual is female. An analysis of the received audio digital data, as performed by the audio analysis unit 404, may provide an indication of how the individual speaks, whether the individual uses a certain accent, or whether the individual has any unusual tonal characteristics. These features of the spoken audio input are then taken into account by the audio signal generation unit 406 in the performance of step 906 whenever it is necessary to generate audio from the textual digital data to replace a missing or corrupted portion of the audio digital data.

Also, if a portion of the audio digital data is missing and must be recreated with reference to the textual digital data, it may be possible to refer to other portions of the audio digital data that have already been used to recreate the missing audio information. For example, if a check of the textual digital data indicates that the missing audio digital data was for the spoken word "dog", one could review earlier portions of the textual digital data to determine if the user spoke the word "dog" earlier in the conversation. If so, the audio digital data corresponding to the earlier occurrence of the spoken word "dog" could be re-used to fill in the sounds corresponding to the missing audio digital data. This process may be made even easier if the textual digital data is a transcription of phonemes, because it may be easier to locate earlier occurrences of the missing phonemes.

If a previously played portion of the spoken audio input is to be used to replace a missing portion of the audio digital data, there is a reasonable chance that the missing sounds will have occurred more than once earlier in the conversation. For example, if the missing portion of the audio digital data corresponds to a particular phoneme, that phoneme may well have been previously spoken multiple times by the individual who provided the spoken audio. In this instance, an average or mean of the audio digital data corresponding to the previous occurrences of the phoneme may be used to replace the missing audio digital data. Further, the average or mean of the audio digital data corresponding to the previous occurrences of the phoneme may be adjusted for volume and duration based on the portions of the audio digital surrounding the missing portion of the audio digital data. There same techniques, however, would also apply to generating sounds from textual representation data that represents a normal text transcription of the spoken audio input.

Those skilled in the art will appreciate that steps 902, 904 and 906 of the method illustrated in FIG. 9 will be performed substantially simultaneously for different portions of the received data until the telephony communication is terminated.

Figure 10:
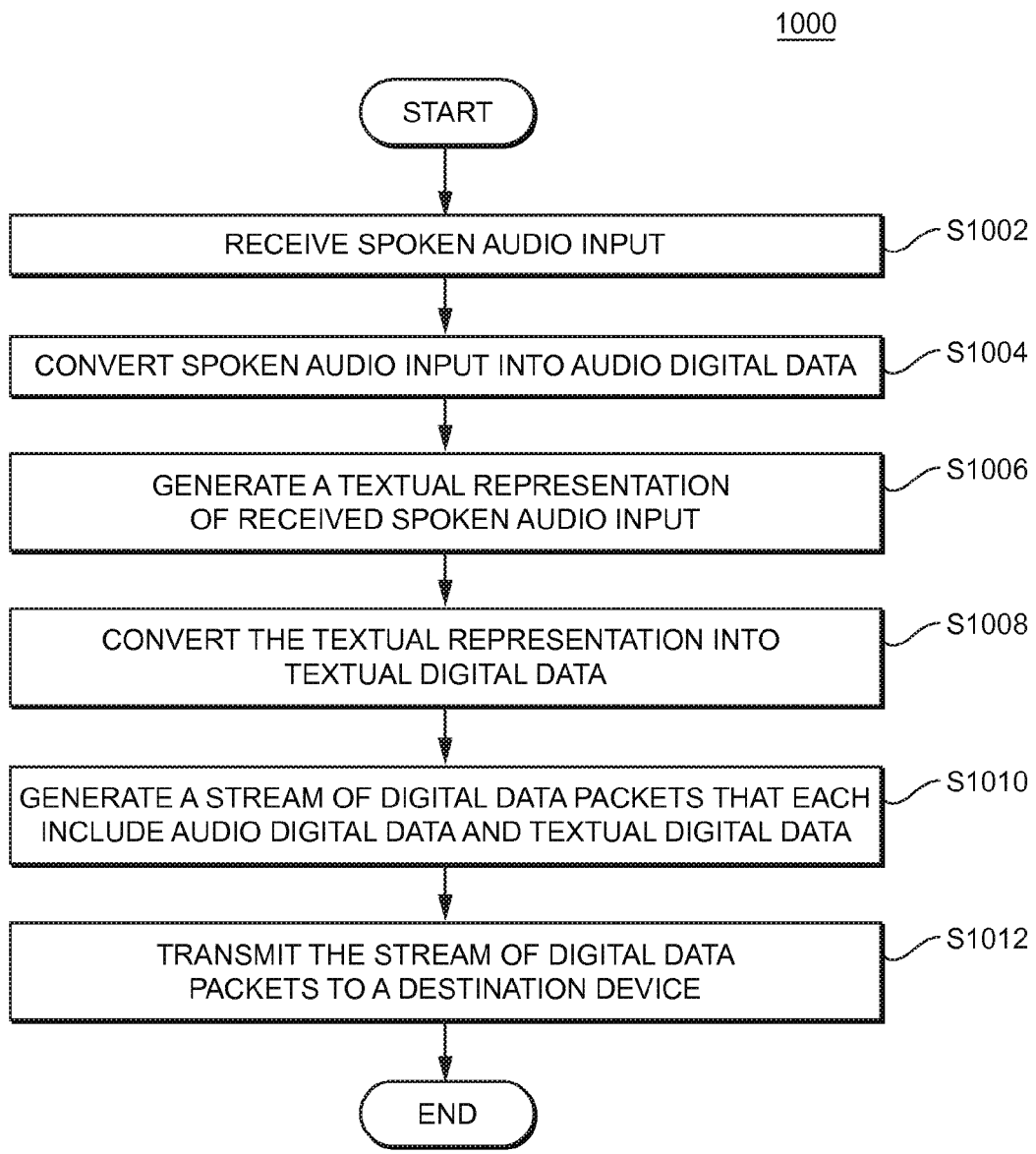
FIG. 10 is a flow diagram illustrating steps of a second method of receiving spoken audio input, converting the spoken audio input into digital data, and transmitting the digital data to a destination device.

FIG. 10 illustrates a second method for converting spoken audio input into audio and digital data and for sending the digital data to a destination device. This method is performed by elements of a conversion and transmission unit 300 of an IP telephony device. In this method, both audio digital data and textual digital data are encoded into a single stream of data packets.

The method 1000 begins and proceeds to step S1002 where spoken audio input is received from a user by an audio input receiving unit 302. In step S1004, the spoken audio input is converted into audio digital data by a CODEC based conversion unit 304. In step S1006, a textual representation conversion unit 306 generates a textual representation of the received spoken audio input. In step S1008, that textual representation is converted into textual digital data.

In step S1010, the digital data packet generation unit generates a single stream of data packets using both the audio digital data and the textual digital data. Audio digital data is loaded into a first portion of each digital data packet and textual digital data is loaded into a second portion of each digital data packet. In some embodiments, both the audio digital data and the textual digital data is loaded into the payload of the data packet, and the textual digital data is always loaded into either the first portion of the payload or the last portion of the payload of the data packet. Step S1010 could include loading textual digital data packet size information into the data packet, the size information being indicative of the amount of textual digital data that has been loaded into the data packet.

In step S1012, the stream of digital data packets generated by the digital data packet generation unit 308 is transmitted to a destination device by a transmission unit 314. As will be appreciated by one skilled in the art, steps S1004-S1012 would be performed simultaneously for different portions of the spoken audio input until the telephony communication is terminated, at which point the method ends.

Figure 11:
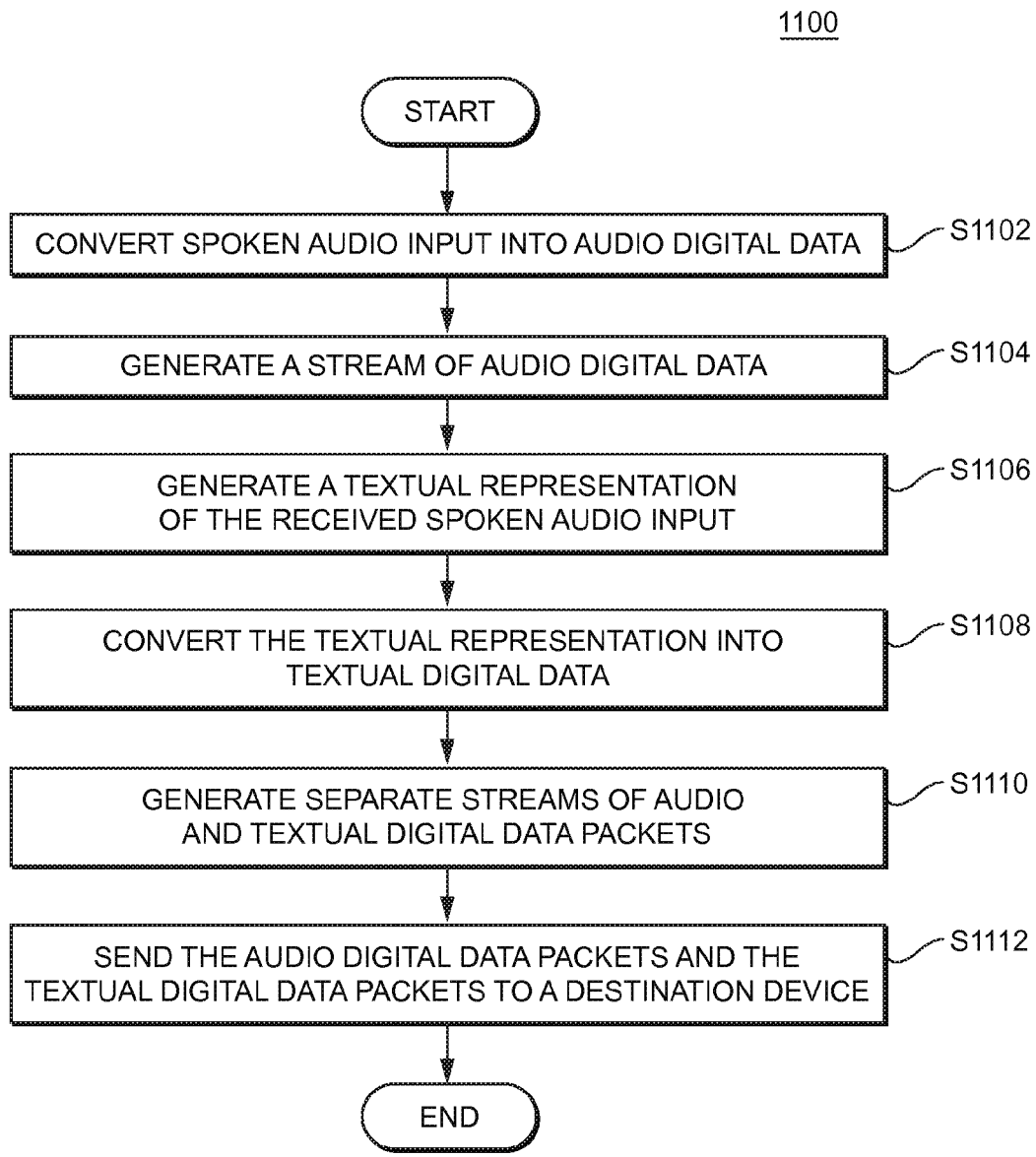
FIG. 11 is a flow diagram illustrating steps of a third method of receiving spoken audio input, converting the spoken audio input into digital data, and transmitting the digital data to a destination device.

FIG. 11 illustrates a third method for converting spoken audio input into audio and digital data and for sending the digital data to a destination device. This method also is performed by elements of a conversion and transmission unit 300 of an IP telephony device. In this method, audio digital data and textual digital data are encoded into separate streams of data packets.

The method 1100 begins and proceeds to step S1102 where spoken audio input is received from a user by an audio input receiving unit 302. In step S1104, the spoken audio input is converted into audio digital data by a CODEC based conversion unit 304. In step S1106, a textual representation conversion unit 306 generates a textual representation of the received spoken audio input. In step S1008, that textual representation is converted into textual digital data.

In step S1110, the digital data packet generation unit 308 generates a stream of audio digital data packets using the audio digital data and also generates a separate stream of textual digital data packets using the textual digital data. One or more sequence numbers of audio digital data packets in the audio digital data packet stream may be loaded into each textual digital data packet as a way of tying the information in the audio digital data packets to the information in the textual digital data packets. Each textual digital data packet would contain the sequence numbers of the audio digital data packets that correspond to the same portion of the spoken audio input that is represented by the textual digital data in the textual digital data packet.

In step S1112, the two streams of audio and textual digital data packets generated by the digital data packet generation unit 308 are transmitted to a destination device by a transmission unit 314. As will be appreciated by one skilled in the art, steps S1104-S1112 would be performed simultaneously for different portions of the spoken audio input until the telephony communication is terminated, at which point the method ends. Generating and transmitting both audio digital and textual digital data, and using both types of data to recreate spoken audio input, may be a feature that users can activate and deactivate as needed. For example, if a user finds that the quality of an IP telephony communication is relatively poor, the user may switch this feature on in an attempt to improve the quality of the IP telephony communication. In other embodiments, the IP telephony system may monitor the perceived quality of individual telephony communications and instruct the devices involved in a telephony communication to implement the above methods when perceived quality is poor.

Also, the ability of a particular IP telephony device to conduct a speech-to-text transcription of spoken audio input, or to generate appropriate sounds from textual digital data may be somewhat dependent on the processing power and memory of the IP telephony device. Likewise, the ability of an IP telephony device to generate a phoneme transcription of spoken audio input, or to recreate sounds from a phoneme transcription may also be dependent on the processing power and memory of the IP telephony device. For these reasons, different versions of IP software used to implement the conversion and transmission unit 300 and the audio signal generation unit 400 may be loaded onto or activated to different extents on different types of IP telephony devices based on the capabilities of the IP telephony devices.

In many of the foregoing descriptions, a software application running on a telephony device performs various functions. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

Also, although many of the examples provided about related to telephony communications, those telephony communications could be audio or video calls, or other forms of telephony communications. The methods and techniques described above could be used to enable many different types of communications. Thus, the foregoing references to calls or telephony communications should in no way be considered limiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of converting and transmitting audio information, comprising:
   receiving spoken audio input;
   converting the received spoken audio input into audio digital data that is representative of the received spoken audio input;
   generating a stream of audio digital data packets that contain the audio digital data;
   generating a textual representation of the received spoken audio input;
   generating a stream of textual digital data packets that contain the generated textual representation of the received spoken audio input; and
   transmitting the stream of audio digital data packets and the stream of textual digital data packets to a destination device;
   wherein at least one of the audio digital data packets and/or the textual digital data packets include information that indicates which audio digital data packets and textual digital data packets contain data relating to the same portions of the received spoken audio input.

2. The method of claim 1, wherein the each textual digital data packet includes sequence number information for at least one audio digital data packet that contains audio digital data that corresponds to the same portion of the received audio input as the textual digital data that is loaded in the textual digital data packet.

3. The method of claim 1, wherein generating a textual representation of the received spoken audio input comprises:
   extracting phonemes from the received spoken audio input; and
   generating a textual representation of the extracted phonemes.

4. The method of claim 3, wherein extracting phonemes from the received spoken audio input comprises:
   determining the language of the received spoken audio input; and
   extracting phonemes from the received spoken audio input based on the determined language.

5. The method of claim 1, wherein converting the received spoken audio input into digital data comprises using a CODEC to convert the received spoken audio input into audio digital data.

6. The method of claim 1, wherein generating a textual representation of the received spoken audio input comprises performing a speech-to-text conversion of the received spoken audio input.

7. The method of claim 1, wherein each textual digital data packet includes sequence numbers assigned to the audio digital data packets that contain audio digital data that corresponds to the same portion of the received audio input as the textual digital data that is loaded in the textual digital data packet.

8. The method of claim 1, wherein each audio digital data packet includes a sequence number assigned to at least one of the textual digital data packets that contains textual digital data that corresponds to the same portion of the received audio input as the audio digital data that is loaded in the audio digital data packet.

9. A system for converting and transmitting audio information, comprising:
   means for receiving spoken audio input;
   means for converting the received spoken audio input into audio digital data that is representative of the received spoken audio input;
   means for generating a stream of audio digital data packets that contain the audio digital data;
   means for generating a textual representation of the received spoken audio input;
   means for generating a stream of textual digital data packets that contain the generated textual representation of the received spoken audio input; and
   means for transmitting the stream of audio digital data packets and the stream of textual digital data packets to a destination device;
   wherein at least one of the audio digital data packets and/or the textual digital data packets include information that indicates which audio digital data packets and digital data packets contain data relating to the same portions of the received spoken audio input.

10. A system for converting and transmitting audio information, comprising:
    an audio input receiving unit that receives spoken audio input;
    a first conversion unit that converts the received spoken audio input into audio digital data that is representative of the received spoken audio input;
    an audio digital data packet generation unit that generates a stream of audio digital data packets that contain the audio digital data;
    a textual representation conversion unit that generates a textual representation of the received spoken audio input;
    a textual digital data packet generation unit that generates a stream of textual digital data packets that contain the generated textual representation of the received spoken audio input; and
    a transmission unit that transmits the stream of audio digital data packets and the stream of textual digital data packets to a destination device;
    wherein at least one of the audio digital data packets and/or the textual digital data packets include information that indicates which audio digital data packets and digital data packets contain data relating to the same portions of the received spoken audio input.

11. The system of claim 10, wherein the each textual digital data packet includes sequence number information for at least one audio digital data packet that contains audio digital data that corresponds to the same portion of the received audio input as the textual digital data that is loaded in the textual digital data packet.

12. The system of claim 10, wherein the textual representation conversion unit extracts phonemes from the received spoken audio input and generates a textual representation of the extracted phonemes.

13. The system of claim 12, wherein the textual representation conversion unit determines the language of the received spoken audio input, and extracts phonemes from the received spoken audio input based on the determined language.

14. The system of claim 10, wherein first conversion unit uses a CODEC to convert the received spoken audio input into audio digital data.

15. The system of claim 10, wherein the textual representation conversion unit performs a speech-to-text conversion of the received spoken audio input.

16. The system of claim 10, wherein the textual digital data packet generation unit inserts into each textual digital data packet sequence numbers assigned to the audio digital data packets that contain audio digital data that corresponds to the same portion of the received audio input as the textual digital data that is loaded in the textual digital data packet.

17. The system of claim 10, wherein the audio digital data packet generation unit inserts into each audio digital data packet a sequence number assigned to at least one of the textual digital data packets that contains textual digital data that corresponds to the same portion of the received audio input as the audio digital data that is loaded in the audio digital data packet.

* * * * *